United States Patent [19]
Snider

[11] 4,020,579
[45] May 3, 1977

[54] BITE SIGNALLING ATTACHMENT FOR ICE FISHING POLE

[76] Inventor: Cleo E. Snider, Rte. 1, Penny Ave., Cedar Springs, Mich. 49319

[22] Filed: Feb. 17, 1976

[21] Appl. No.: 658,379

[52] U.S. Cl. .................................................. 43/17
[51] Int. Cl.² ...................................... A01K 97/12
[58] Field of Search .................................. 43/17, 16

[56] References Cited
UNITED STATES PATENTS

| | | | |
|---|---|---|---|
| 2,931,122 | 4/1960 | Thordson et al. | 43/17 |
| 3,143,822 | 8/1964 | Schooley | 43/17 |
| 3,529,375 | 9/1970 | Dey | 43/17 |
| 3,916,554 | 11/1975 | Hullett | 43/17 |

Primary Examiner—Louis G. Mancene
Assistant Examiner—Daniel J. Leach
Attorney, Agent, or Firm—Clarence A. O'Brien; Harvey B. Jacobson

[57] ABSTRACT

An elongated spring structure is attached to the outer end of a fishing rod with the elongated spring structure projecting endwise outwardly of the rod. The outer end of the spring structure defines a transverse line guide eye directed laterally outwardly of one side of the spring structure and the outer end of the rod includes a transverse line guide eye directed laterally outwardly of the same side of the rod. The elongated spring structure is readily deflectable as a result of a lateral force being directed against the outer end thereof to bend the spring structure across the outer end of the rod outwardly thereof and into position with the eye of the spring structure spaced substantially right angularly outwardly of the eye carried by the outer end of the rod. The light construction of the spring structure enables the latter to support a short length of fishing line extending downwardly therefrom and through a hole in the ice with the spring structure only slightly deflected. Accordingly, even the slightest pull on the line by a fish nibbling at a baited hook at the lower end of the line will cause the outer end of the spring structure to vibrate up and down in a readily visual manner.

7 Claims, 4 Drawing Figures

BITE SIGNALLING ATTACHMENT FOR ICE FISHING POLE

BACKGROUND OF THE INVENTION

Various forms of line guiding signalling devices for fishing rods have been heretofore designed. However, most of these devices have not been constructed in a manner whereby they may be made of light spring construction and yet readily demountable from an associated rod. Further, previously known sping-type bite signalling devices for fishing rods have for the most part been cumbersome to use, or they have not been constructed in a manner to provide for appreciable lightly resisted downward line movement before the tension of the line depending downwardly therefrom is transferred to the associated rod end.

Examples of bite signalling devices including some of the basic structural and operational features of the instant invention are disclosed in U.S. Pat. Nos. 2,697,894, 3,057,105, 3,058,249, 3,143,822 and 3,529,375.

BRIEF DESCRIPTION OF THE INVENTION

The bite signalling attachment of the instant invention is constructed in a manner whereby it may be readily removably attached to an associated fishing rod tip and whereby the signalling device or attachment will allow considerable downward movement of the associated fishing line before the tension of the fishing line is transferred directly to the tip of the associated fishing rod or pole.

Also, the attachment has as its basic component a single strand of spring wire bent in half back upon itself and with the free ends of the wire supported from the associated rod end. The outer end of the attachment includes a wrap spaced slightly inwardly of the terminal end whereby the bent portion of the wire defines a line guiding eye, which line guiding eye is bent into laterally outwardly projecting position.

The main object of this invention is to provide a bite signalling attachment for the outer end of the fishing pole or rod capable of providing a readily visual indication of the slightest nibble at the baited hook of the associated fishing line.

Another object of this invention is to provide a bite signalling attachment is accordance with the immediately preceding object and including structure whereby an appreciable length of the associated line may be pulled out by a fish nibbling at the baited hook of the line before the tension of the line is transferred directly to the tip of the associated fishing pole or rod.

A final object of this invention to be specifically enumerated herein is to provide a bite signalling attachment for the free end of a fishing rod which will conform to conventional forms of manufacture, be of simple construction and easy to use so as to provide a device that will be economically feasible, long lasting ad relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
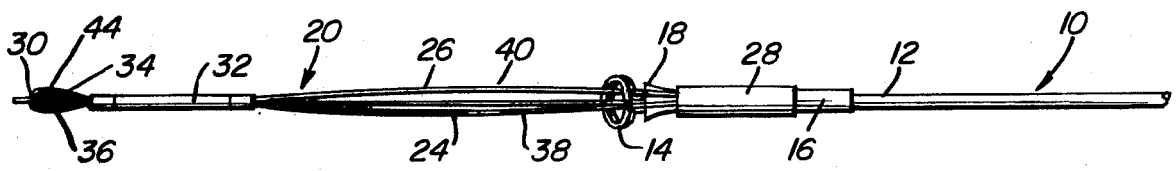
FIG. 1 is a fragmentary top plan view of the outer end of a conventional form of fishing rod with the bite signalling attachment of the instant invention operatively associated therewith.

Referring now more specifically to the drawings, the numeral 10 generally designates a conventional form of fishing rod including an outer end 12 upon which a first transverse line guid eye 14 is mounted with the eye projecting or directed laterally outwardly of the underside of the rod 10. The eye 14 is of conventional design and is secured to the outer end of the rod 10 by means of a mounting sleeve 16 including a flared outer end 18 from which the first eye 14 is supported.

The bite signalling attachment of the instant invention is referred to in general by the reference numeral 20 and comprises a single strand of spring wire 22 bent approximately 180° centrally intermediate its opposite ends. The end portions 24 and 26 of the wire 22 generally parallel each other and are secured at their free ends in any convenient manner to opposite side portions of a channel-shaped mounting clip 28 with the wire 22 projecting endwise outwardly of one end of the clip.

The base ends of the end portions 24 and 26 spaced slightly from the bend 30 formed in the mid-portion of the wire 22 are wrapped or enclosed within a sleeve 32 and those portions of the end portions 24 and 26 on the side of the sleeve 32 remote from the mounting clip 28 have smooth bends 34 and 36 formed therein of slightly less than 90 degress extent. Accordingly, those portions of the wire 22 defining the bends 30, 34 and 36 define a second transverse line guide eye directed outwardly laterally of one side of the attachment 20.

Figure 4:
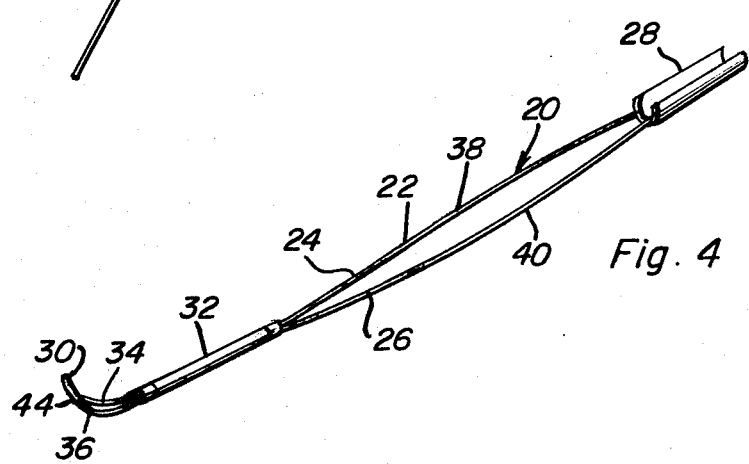
FIG. 4 is a perspective view of the bite signalling attachment.

From FIG. 4 of the drawings, it may be seen that those portions of the end portions 24 and 26 extending between the sleeve 32 and the mounting clip or channel 28 are slightly bowed away from each other as at 38 and 40.

Figure 2:
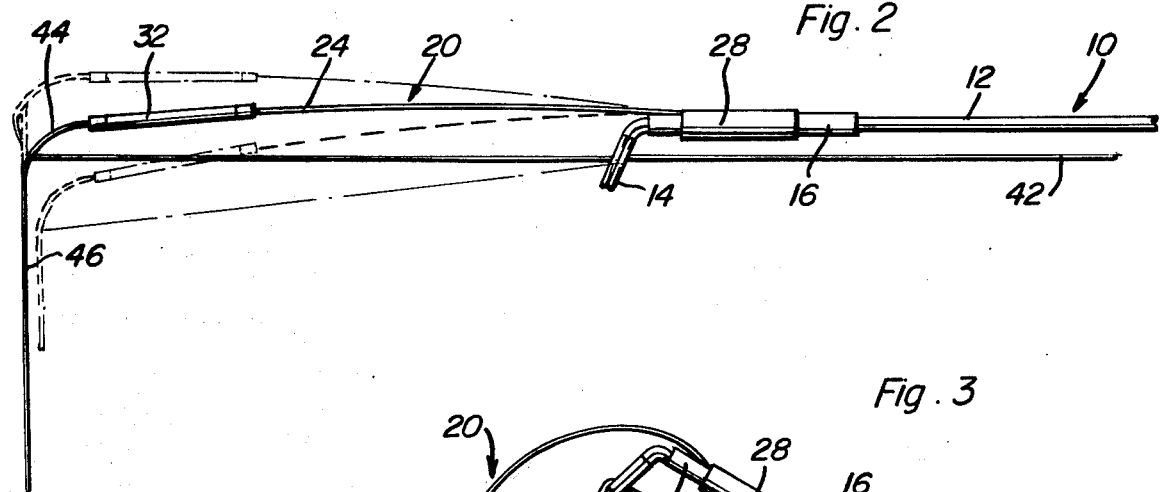
FIG. 2 is a fragmentary side elevational view of the assemblage illustrated in FIG. 1 with alternate positions of the bite signalling attachment illustrated in phantom lines.
Figure 3:
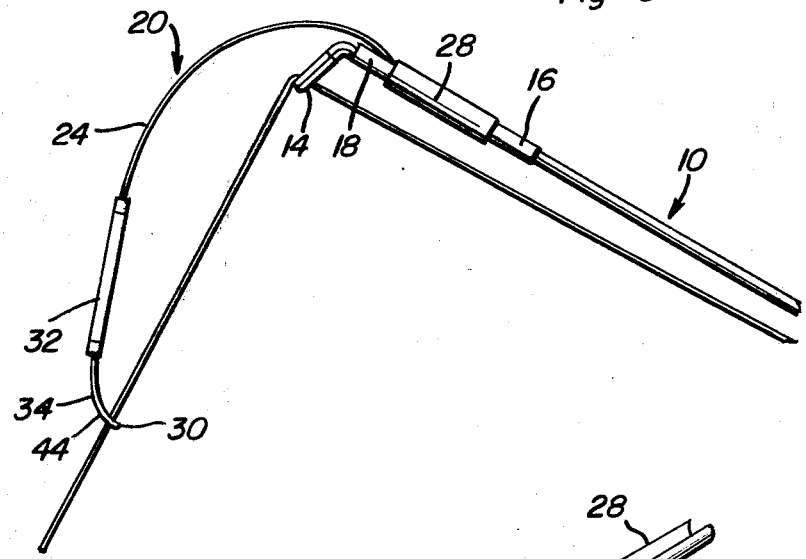
FIG. 3 is a fragmentary side elevational view similar to FIG. 2 but with the bite signalling attachment in the fully bent position it assumes when the tension of the associated fishing line is transferred directly to the eye at the outer end of the associated fishing pole or rod.

It will be noted from FIGS. 1, 2 and 3 of the drawings, that the mounting sleeve 16 represents a somewhat diametrically enlarged tip on the free end of the rod 10 and it is to be noted that the mounting clip or channel 28 is partial cylindrical in configuration and of an angular extent of slightly greater than 180 degrees. In order to mount the attachment 20 on the rod 12, it is merely necessary to laterally engage the clip or channel 28 with that portion of the rod 10 inwardly of mounting sleeve 16 and to then longitudinally advance the clip or channel 28 outwardly along the rod 10 and over the sleeve 16 unti the clip or channel 28 seats against the flared outer end 18 of the sleeve 16. At this point, the clip or channel 28 will be wedged into position on the mounting sleeve 16. Of course, the line 42 of the rod 10 extends through the first eye 14 and thereafter through the second eye 44 defined by the bends 30, 34 and 36. After passing through the second eye 44, the line 42 depends downwardly as at 46 and through the associated hole in the ice. The vertical distance of the line 46 from the eye 44 down into the water is reasonably short and accordingly, assuming that a heavily weighted line is not being used, only a short length of the line 46 which is not buoyed up by the associated water is supported by the attachment 20. Therefore, the free outer end of the attachment 20 is deflected only slightly downwardly.

However, when a fish nibbles only slightly on a baited hook carried by the lower end of the line 46, the outer end of the attachment 20 oscillates visibly between the upper and lower phantom line positions thereof illustrated in FIG. 2. Further, the sleeve 32 may be of brightly colored material in order that a fisherman may readily visually ascertain when a fish is beginning to nibble on a baited hook.

As soon as the fish takes the baited hook into its mouth and applies slight tension to the line 46, the attachment 20 will be deflected downwardly below the lower phantom line position thereof illustrated in FIG. 2. However, the attachment 20 applies very light upward tension on the line 46 which prevents the fish from spitting the baited hook out of its mouth. Thereafter, as the fish realizes that the hook is in its mouth and it begins to run with the baited hook, the attachment 20 will bent downwardly to the position thereof illustrated in FIG. 3 before the tension of the line 46 is transferred directly to the eye 14 of the relatively stiff rod 10. During this time, the fish has accelerated and when the line becomes taut against the eye 14, the hook is "set" in the fish's mouth.

If it is desired, a single strip-type leaf spring may be utilized in lieu of the wire 22. However, the wire 22 has certain advantages in that the outer eye 44 may be formed as an integral portion thereof whereas a single strip-type of spring would require the attachment of an eye to the outer end thereof. Further, the wire-type of attachment 20 may be laterally directed in a horizontal plane without injury thereto whereas a strip-type of spring might be kinked by such lateral deflection in a horizontal direction, or the mounting of such a strip-type spring to the end of an associated rod might have excess forces applied thereto. Still further, the wire form of attachment is capable of withstanding relatively rough usage while at the same time being capable of exerting but a slight spring pressure against downward deflection of the line 46 from the solid line position of the attachment 20 illustrated in FIG. 2 to the downwardly deflected position of the attachment 20 illustrated in FIG. 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a fishing rod having a support sleeve mounted on its outer end, the outer end of said sleeve including a first transverse line guide eye directed laterally outwardly of one side of said rod, a bite signalling attachment comprising an elongated spring structure, one end of said spring structure being anchored to the other side of said rod closely inwardly of said eye and with said spring structure substantially paralleling said rod and projecting endwise outwardly of the outer end thereof, the outer end of said spring structure including means defining a second transverse line guide eye directed laterally of the side of said spring structure corresponding to said one side of said rod, said elongated spring structure being readily deflectable as a result of a lateral force being directed against the outer end thereof to bend said spring structure across the outer end of said rod outwardly thereof and into position with said second eye spaced substantially right angularly outwardly of said first eye on said one side of said rod, said sleeve defining a transversely enlarged end portion on said outer end of said rod, an elongated longitudinally slotted sleeve member whose slot is of greater width than the width of the outer end portion of said rod inwardly of said sleeve, said sleeve member being laterally engageable with said outer end portion and thereafter longitudinally snugly telescopingly engageable over said sleeve, said one end of said spring structur being anchored relative to said sleeve member.

2. The combination of claim 1 wherein the outer end of said sleeve is flared, said sleeve member being frictionally seated on said flared outer end of said sleeve.

3. The combination of claim 1 wherein said elongated spring structure comprises a single strand of spring wire bent back upon itself centrally intermediate its opposite ends defining a loop at its outer end and a pair of end portions at its other inner end comprising said one end of said spring structure, said pair of end portions being anchored relative to said sleeve member and said loop being laterally displaced into position aligned with said eye, and a sleeve structure encircling said pair of end portions inwardly of said loop and outwardly of said sleeve member.

4. The combination of claim 3 wherein said eye, when said rod is horizontally disposed, is directed downwardly and said slot in said sleeve member opens downwardly, said pair of end portions being anchored to upper sides portions of said sleeve member above said sleeve and said loop being directed downwardly.

5. The combination of claim 4 wherein said sleeve structure is disposed closely adjacent said loop and is brightly colored.

6. The combination of claim 5 wherein the outer end of said sleeve is flared, said sleeve member being frictionally seated on said flared outer end of said sleeve.

7. The combination of claim 6 wherein said pair of end portions intermediate said sleeve structure and said sleeve member are slightly bowed away from each other.

* * * * *